United States Patent
Nagase

[11] 3,888,603
[45] June 10, 1975

[54] COMPRESSOR GOVERNOR
[75] Inventor: Minoru Nagase, Kobe, Japan
[73] Assignee: The Nippon Air Brake Company, Kobe, Japan
[22] Filed: Feb. 14, 1974
[21] Appl. No.: 442,358

[30] Foreign Application Priority Data
Mar. 10, 1973 Japan.............................. 48-28404

[52] U.S. Cl.................................. 417/25; 417/44
[51] Int. Cl............................................ F04b 47/00
[58] Field of Search......................... 417/25, 18, 44

[56] References Cited
UNITED STATES PATENTS
1,003,163  9/1911  Turner............................. 417/44 X Primary Examiner—C. J. Husar
Assistant Examiner—Richard E. Gluck
Attorney, Agent, or Firm—R. W. McIntire, Jr.

[57] ABSTRACT

Compressor governor apparatus including a governor device characterized by a delivery valve portion for effecting delivery and release of operating pressure to and from cut-out means for cutting out and cutting in compressor operation, respectively, a pilot portion responsive to predetermined high and low pressures prevailing in a storage reservoir for effecting snap acting operation of said delivery valve portion, and a pressure reducer portion for reducing the degree of said operating pressure to a minimum sufficient for operating said cut-out means.

5 Claims, 1 Drawing Figure

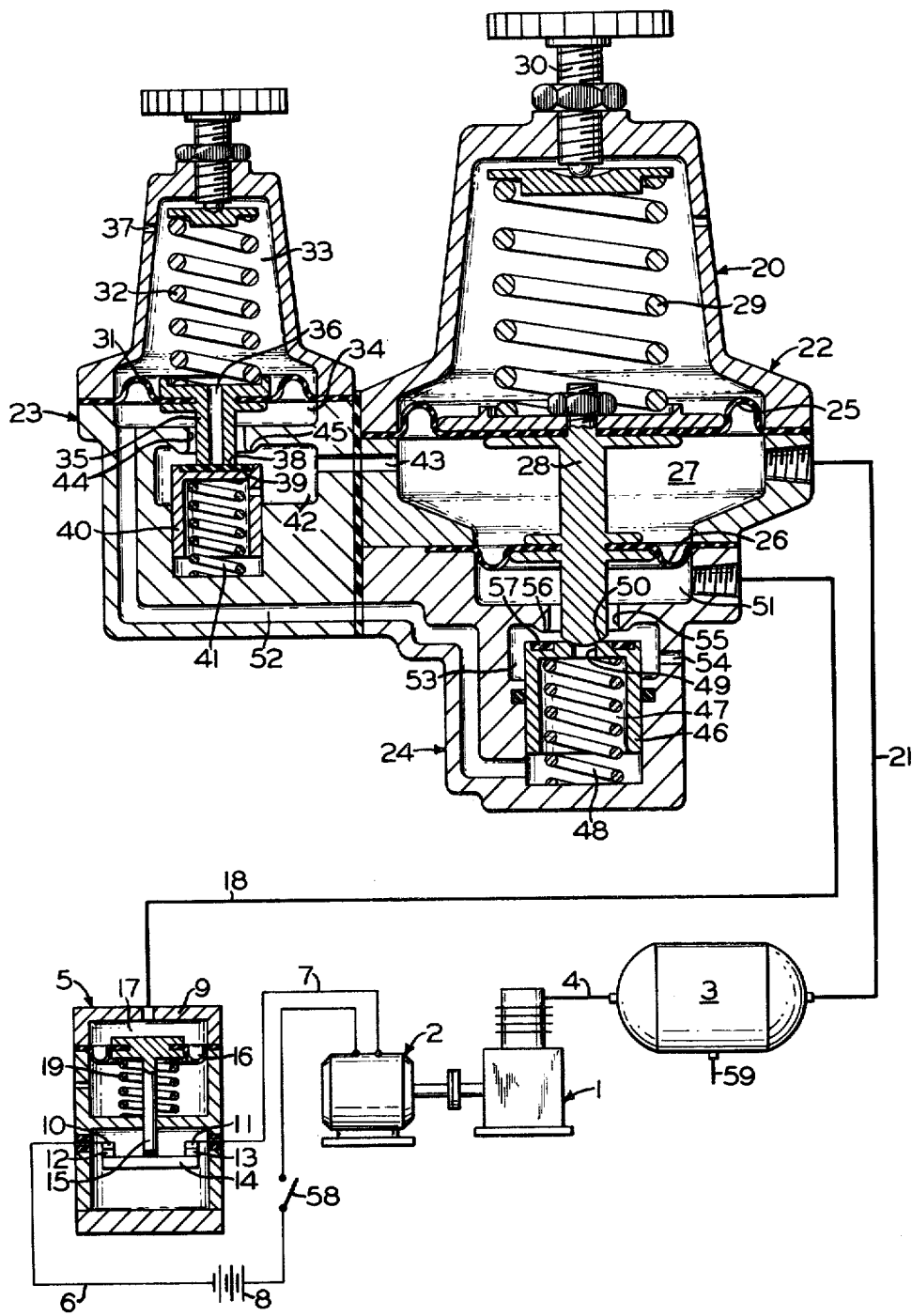

COMPRESSOR GOVERNOR

BACKGROUND OF THE INVENTION

In some of the presently known compressor governor apparatus in which a pressure switch is used, particularly one having a metal piston therein, for cutting in and cutting out operation, the hysteresis of such pressure switch is utilized in determining the high and low limits of the pressure range within which the governor apparatus operates. The hysteresis of such a pressure switch, however, is not adjustable, nor is it reliable since it varies as the piston wears. It is difficult, therefore, to maintain the operating range within preselected limits.

Another type of compressor governor apparatus utilizes an electrical switch which is closed or opened depending upon the position of a piston subjected to the storage reservoir pressure. This type of arrangement is also undesirable in that it is susceptible to environmental conditions such as temperature and vibration, for example.

Moreover, compressor governors of the type above discussed lack responsive sensitivity to precise degrees of control pressure, and those using mostly precisely machined parts are more costly to manufacture and apt to develop leakage as the parts wear.

SUMMARY OF THE INVENTION

The object of the present invention, therefore, is to provide a compressor governor characterized by high sensitivity of response to control pressure, non-responsiveness to environmental disturbances, and low manufacturing costs.

Briefly, the governor device embodying the invention, comprises a delivery valve portion for effecting delivery and release of operating pressure in open and closed positions, respectively, to and from cut-out means for cutting out and cutting in compressor operation, a pilot portion including a pair of diaphragms of different pressure areas connected by a common stem, subjectable in opposing relation to pressure in a control chamber therebetween connected to the storage reservoir, and operable responsively to pressure in said control chamber (and therefore in the reservoir) within predetermined upper and lower pressure limits for operating the delivery valve portion to its open and closed positions, respectively, said operating pressure supplied via said delivery valve means for operating the cut-out means being provided from said control chamber, and self-lapping pressure reducing valve means interposed between said control chamber and said delivery valve means for reducing the operating pressure to a preselected degree less than that prevailing in the control chamber before supply thereof to the delivery valve means and the cut-out means.

The single FIGURE drawing is a schematic view, both in outline and in section, of compressor governor apparatus embodying the invention.

DESCRIPTION AND OPERATION

The apparatus shown in the drawing comprises an air compressor 1 driven by an electric motor 2 for charging a storage reservoir 3 via a conduit or pipe 4, the pressure in said reservoir being available for operating any fluid pressure operable device or devices connected thereto.

Electric motor 2 is operably controlled by a fluid pressure operable switch device 5 serially interposed between electrical conductors 6 and 7 comprising a power circuit in which said motor and a power source, illustrated by a battery 8, are also serially connected.

Switch device 5 comprises a casing 9 in which a pair of terminal contacts 10 and 11, fixed to respective ends of conductors 6 and 7, are oppositely disposed. Contacts 10 and 11 are in such position as to be contacted by or out of contact with respective contacts 12 and 13 fixed at opposite ends of a connecting bar 14 carried at one end of a piston stem 15. The opposite end of stem 15 is fixed to a diaphragm type piston 16 subjectable on one side to fluid pressure in an adjacent operating pressure chamber 17 connected to a conduit or pipe 18 via which operating fluid pressure may be supplied to or released from said chamber in a manner to be hereinafter described. A spring 19 urges piston 16 upwardly, as viewed in the drawing, to an energizing or actuating position in which contacts 12 and 13 are brought into contact with contacts 10 and 11, in which they are shown in the drawing, to therefore actuate motor 2. When chamber 17 is charged with fluid pressure sufficient for overcoming spring 19, piston 16 is moved downwardly, and contacts 12 and 13 are moved out of contact with contacts 10 and 11 to a shut-off position in which the power circuit is opened to effect shut-down of motor 2.

The air compressing apparatus shown in the drawing further comprises a novel governor device 20 interposed between pipe 18 and a pipe 21 connecting with reservoir 3. Governor device 20 comprises an actuator or pilot device 22, a reducing valve device 23, and a delivery valve device 24.

Actuator device 22 comprises a piston assembly including a pair of oppositely facing diaphragms 25 and 26 having a control pressure chamber 27 disposed therebetween and into which pipe 21 from reservoir 3 opens. Diaphragms 25 and 26 are concentrically secured in axially spaced relation on a piston stem 28 for unitary movement and are of different dimension with respect to effective pressure areas thereof. As shown in the drawing, the ratio of the effective pressure area of diaphragm 25 to that of diaphragm 26 is approximately 2 : 1.

Diaphragms 25 and 26 are biased in a downward direction, as viewed in the drawing, by a spring 29 compressibly adjustable by an adjusting screw 30.

Reducing valve device 23 is of the self-lapping type comprising a diaphragm 31 subject on one side to the force of a compressibly adjustable spring 32 in a spring chamber 33 and on the opposite side to the force of fluid pressure prevailing in a low pressure chamber 34. Reducing valve device 23 further comprises an exhaust valve member 35 carried by and movable coaxially with diaphragm 31 and having a coaxial passageway 36 extending therethrough to communicate with atmosphere via spring chamber 33 and an atmospheric vent port 37. Communication to atmosphere via passageway 36 is cut off when the lower end, as viewed in the drawing, of exhaust valve member 35 forming an annnular exhaust valve 38 is seated on a disc type supply valve 39 carried by an axially movable valve carrying member 40 slidably disposed in the reducing valve device 23 in axial alignment with exhaust valve member 35. A light spring 41 acts on exhaust valve member 35 through member 40 with a lesser force, on the order of 5 pounds for example, in opposition to that exerted by spring 32, and urges member 40 upwardly and, therefore, supply valve 39 into a seated or cut-off position relative to exhaust valve 38.

Reducing valve device 23 is also provided with a fluid pressure supply chamber 42 in constant communication, via a passageway 43, with control pressure chamber 27 of pilot device 22 and communicable with low pressure chamber 34 via a bore 44 formed coaxially in an internal transverse wall of said reducing valve device. The end of bore 44 adjacent supply chamber 42 is surrounded by an annular valve seat 45 against which supply valve 39 seats when in a closed position.

Reducing valve device 23 operates in conventional manner to establish a certain low pressure in low pressure chamber 34 for a purpose to be hereinafter disclosed. With exhaust valve 38 seated on supply valve 39, when pressure in low pressure chamber 34 from supply chamber 42 and acting on diaphragm 31, attains a value sufficient for overcoming the opposing force of spring 32, said diaphragm, along with exhaust valve member 35, moves upwardly until supply valve 39, through the biasing action of spring 41, causes said supply valve to be seated on valve seat 45 and thereby cut off communication between said low pressure chamber and said supply chamber. Under these conditions, exhaust valve 38 and supply valve 39 occupy respective seated positions on the respective valve seats 39 and 45. Thereafter reducing valve device 23 functions in conventional manner to maintain the preselected degree of pressure in low pressure chamber 34, that is, if the pressure in said low pressure chamber increases (by back feed, for example) to a value above said preselected degree, exhaust valve 38 opens to bleed off the excessive pressure, or if the pressure in said low pressure chamber drops below said preselected value (through leakage or operation of delivery valve portion 24), supply valve 39 is opened until such pressure is brought back up to the preselected degree.

It should be apparent that the preselected degree of pressure established in low pressure chamber 34 is determined by the dimension of diaphragm 31, the adjusted compression of spring 32, and the compression rating of spring 41.

Delivery valve device 24 is operably connected by stem 28 with pilot device 22 and comprises a reciprocably operable delivery valve member 46 axially aligned with said stem below the double diaphragm actuator of said pilot device. Delivery valve member 46 is provided with an internal recess or low pressure storage chamber 47 in which a light spring 48, on the order of 10 pounds for example, is disposed for normally urging said valve member in an upwardly direction, as viewed in the drawing, and therefore the upper end thereof, into abutting contact with the lower end of piston stem 28. The upper end of valve member 46 is provided with a concentric opening 49 which acts as a delivery valve seat for the lower end of piston stem 28 which forms a delivery valve 50 cooperating with said valve seat to control communication between recess 47 and a delivery chamber 51 disposed adjacent the lower side of smaller diaphragm 26. Delivery chamber 51 is connected via conduit 18 to chamber 17 of pressure switch 5, while recess 47 is connected via the open end thereof and a passageway 52 to low pressure chamber 34 of reducing valve device 23.

An exhaust chamber 53 open to atmosphere via an atmospheric port 54 is communicable with delivery chamber 51 via a central bore 55 formed in a transverse internal wall. The end of bore 55 adjacent exhaust chamber 53 comprises an annular valve seat 56 which cooperates with a valve element 57 fixed on the upper end of delivery valve member 46 to provide exhaust valve means which, when open, provides for exhaust of fluid pressure in chamber 17 of pressure switch 5 via pipe 18, delivery chamber 51, bore 55, exhaust chamber 53, and vent port 54.

When the air compressing apparatus, as shown in the drawing, is at rest, the several parts of the various devices are in the respective positions in which they are shown. Prior to placing the apparatus into operation, springs 29 and 32 are adjusted to respective predetermined compressions, which, as will become evident hereinafter, determines upper and lower pressure limits of the pressure range at which reservoir 3 is maintained. In order to place the air compressing apparatus into operation, a master switch 58 in the electric power circuit for motor 2 is closed to start up said motor and compressor 1.

For purposes of considering the operation of the compressor govenor, as follows, it may be assumed, though not necessarily limited thereto, that the effective pressure areas of diaphragms 25, 26, and 31 are 2 sq. in., 1 sq. in., and 1 sq. in., respectively.

As pressure builds up in reservoir 3, pressure also builds up at the same rate in control chamber 27 to act on the two diaphragms 25 and 26. Assuming, for example, that it is desired to maintain operating pressure in reservoir 3 within a range having an upper limit of 150 psi. and a lower limit of 125 psi. for any device or devices connected thereto at a connection 59, the compression of spring 29 should be set at 160 pounds, the additional 10 pounds compensating for the 10 pound opposing force exerted by spring 48 in the delivery valve device 24.

While pressure is building up in control chamber 27, such pressure is also building up in communicating chamber 42 and in low pressure chamber 34 of reducing valve device 23. Assuming that the compression of spring 32 is set at 30 pounds with an opposing 5 pounds exerted by spring 41, when the pressure in low pressure chamber 34 approaches 25 psi., diaphragm 31, along with member 35 and 40, moves upwardly until supply valve 39 is seated on valve seat 45 to cut off further communication between said low pressure chamber and communicating chamber 42 to establish a state of equilibrium, wich, as hereinbefore noted, is maintained by the self-lapping nature of reducing valve device 23. Thus the pressure established in low pressure chamber 34, which is substantially 25 psi., is also established and maintained in spring chamber 47 of delivery valve device 24.

Pressure continues to build up in reservoir 3 and in control chamber 27. The relative pressure areas of diaphragms 25 and 26 are of such dimensions that as the pressure in control chamber 27 approaches 150 psi., the net force thereof acting upwardly against diaphragm 25, along with that of spring 48, cause said diaphragms and valve member 46 to move upwardly until valve 57 is seated on valve seat 56. Communication between delivery chamber 51 and atmospheric vent port 54 is thus cut off. With pressure in chamber 27 finally attaining 150 psi., diaphragms 25 and 26 are consequently further moved upwardly to a delivery position in which valve 50 at the lower end of stem 28 is lifted off opening 49 and pressure in spring chamber 47 is immediately communicated to delivery chamber 51, whence it flows via pipe 18 to chamber 17 of pressure switch 5 to cause undelayed downward movement of diaphragm 16 and consequent operation of contacts 12 and 13 to an open position relative to contacts 10 and 11. Thus, with opening of the motor circuit, motor 2 is shut down and further compressing by compressor 1 is also terminated.

Because of the self-lapping characteristic of reducing valve device 23, the pressure in low pressure chamber 34 is maintained substantially at 25 psi., and, therefore, as long as valve 57 remains seated on valve seat 56 and valve 50 remains unseated relative to opening 49, the pressure in chamber 51 of delivery valve device 24 and in chamber 17 of pressure switch 5 also remains at substantially said 25 psi. to maintain diaphragms 25 and 26 in their delivery position and contacts 12 and 13 in their open position until certain conditions, to be hereinafter described, are established.

With compressor 1 shut down, pressure in reservoir 3 and, therefore, in control chamber 27, through usage, leakage, or other similar circumstances, it reduced until the force of spring 29 becomes effective to cause downward movement of diaphragms 25 and 26. Since the pressure of 25 psi. in delivery chamber 51 acting on the lower side of diaphragm 26 adds an additional upwardly directed force acting on the diaphragm assembly, it becomes necessary for the pressure in control chamber 27 to reduce to a value slightly below 150 psi. less the 25 psi. in said delivery chamber, or to a net value of 125 psi.

As diaphragms 25 and 26, along with stem 28, move downwardly, valve 50 on the lower end of said stem first seats on opening 49 to cut off further communication between spring chamber 47 and delivery chamber 51. Further downward movement of diaphragms 25 and 26 with stem 28 to an exhaust position causes unseating of valve 57 from valve seat 56, whereupon pressure in chamber 17 of pressure switch device 5 is immediately vented to atmosphere via pipe 18, delivery chamber 51, bore 55, exhaust chamber 53, and atmospheric port 54.

With pressure vented from chamber 17 of pressure switch 5, spring 19 causes upward movement of diaphragm 16 and, therefore, of contacts 12 and 13 to a closed position relative to contacts 10 and 11. With the motor circuit closed again, motor 2 is actuated to recommence compressing action by compressor 1 to restore pressure in reservoir 3 to the upper limit of 150 psi.

When pressure in reservoir 3 approaches 150 psi., the apparatus functions as above described to terminate compressing action. The apparatus continues to operate in cyclical fashion to maintain the pressure in reservoir 3 within the desired operating range.

Having now described the invention what I claim as new and desire to secure by letters Patent, is:

1. A compressor governor device for maintaining operating pressure in a storage reservoir supplied thereto by compressor means within upper and lower pressure limits of a prescribed range by controlling operation of switch means having an actuating position for actuating the compressor means when presssure in the reservoir reduces to the lower pressure limit and being operable responsively to fluid pressure to a shut-off position for shutting down the compressor means when the pressure in the reservoir attains the higher pressure limit, said governor device comprising:
   a. delivery valve means communicating with a conduit connectable to the switch means, said delivery valve means having a normally closed position in which communication to said conduit is closed and being operable to an open position in which said communication is open and fluid pressure may be delivered to said conduit;
   b. an actuator device connectable to the storage reservoir and operable responsively to fluid at said upper pressure limit for effecting operation of said delivery valve means to its said open position, said actuator device being operable responsively to fluid at said lower pressure limit for restoring said delivery valve means to its said closed position,
   c. said delivery valve means being communicable with said actuator device whence the fluid pressure delivered by the delivery valve means to said conduit is supplied; and
   d. pressure reducing means of the self-lapping type interposed between said actuator device and said delivery valve means for effecting reduction of fluid pressure delivered via said delivery valve means to said conduit to a predetermined low value less than said lower pressure limit.

2. A compressor governor device, as set forth in claim 1, wherein said actuator device comprises:
   a. a piston assembly including a pair of differential pressure area diaphragms and a piston stem on which the diaphragms are concentrically mounted in axially spaced apart relationship for unitary movement of the assembly in one direction to a delivery position for effecting operation of said delivery valve means to its said open position and in an opposite direction to an exhaust position for effecting restoration of said delivery valve means to its said closed position; and
   b. biasing means for exerting a predetermined force on and urging said movement of said piston assembly in said opposite direction,
   c. said diaphragms being subjectable, in opposing relation to fluid pressure prevailing in a control chamber disposed therebetween and connectable to the reservoir, for exerting a net force on the piston assembly in a direction coinciding with said one direction,
   d. said net force being effective, when the pressure in said control chamber attains said upper pressure limit, for overcoming said predetermined force to cause said movement of said piston assembly in said one direction.

3. A compressor governor device, as set forth in claim 2, wherein said delivery valve means comprises:
   a. delivery valve; and
   b. an exhaust valve,
   c. said exhaust valve and said delivery valve being operable sequentially by movement of said piston stem in said one direction, to respective closed and open positions in which said conduits is first closed to atmosphere and then communicated with pressure from said pressure reducing means at said certain low value, and
   d. being operable sequentially by movement of said piston stem in said opposite direction to respective open and closed positions in which said conduit is first closed to said pressure from said pressure reducing means and then opened to atmosphere.

4. A compressor governor device, as set forth in claim 3, wherein the side of the smaller diaphragm opposite said control chamber is subjected to said pressure at said certain low value during such time that said conduit is open thereto for exerting a corresponding force on said piston assembly acting in said one direction.

5. A compressor governor device, as set forth in claim 2, wherein said delivery valve means comprises:
   a. a reciprocably movable delivery valve member including a low pressure storage chamber connected to said pressure reducing means and charged therefrom with fluid at said certain low value less than said lower pressure limit, said delivery valve member having a delivery valve seat formed in one end thereof and opening to said low pressure storage chamber;
   b. a delivery valve formed at one end of said piston stem for seating on said delivery valve seat upon movement of the piston stem in said opposite direction to said exhaust position and unseating therefrom upon movement of the piston stem in said one direction to said delivery position in which fluid pressure in low pressure storage chamber is communicated to said conduit and to the side of the smaller diaphragm opposite said control chamber;
   c. biasing means for urging said delivery valve member and said delivery valve seat formed thereon in a direction coinciding with said one direction toward said seated position on said one end of said piston stem; and
   d. exhaust valve means comprising:
      i. a fixed exhaust valve seat, and
      ii. an exhaust valve element carried by said delivery valve member and operable, upon movement of said piston stem in said one direction, to a seated position on said exhaust valve seat in which said conduit is closed to atmosphere, and being operable, upon movement of said piston stem in said opposite direction, to an unseated position relative to the exhaust valve seat for communicating said conduit to atmosphere,
      iii. said fixed exhaust valve seat being positioned relative to said piston stem and said reciprocable delivery valve member such that during movement of said piston stem in said one direction the exhaust valve element seats before the delivery valve unseats from the delivery valve seat and conversely upon movement of said piston stem in said opposite direction.

* * * * *